Patented Mar. 14, 1950

2,500,146

UNITED STATES PATENT OFFICE 2,500,146

CATALYSTS FOR CONVERSION OF HYDROCARBONS

Raymond N. Fleck, Los Angeles, and Paul G. Nahin, Long Beach, Calif., assignors to Union Oil Company of California, Los Angeles, Calif., a corporation of California No Drawing. Application July 8, 1946, Serial No. 682,128

9 Claims. (Cl. 260—668)

The invention relates to catalysts which find particular usage in the petroleum industry for the catalytic reforming or conversion of hydrocarbons. The catalysts contemplated in the present invention are of the type comprising a carrier or supporting material upon which is distended a catalytic agent.

The principal objects of the invention are to provide catalysts which exhibit high catalytic activity, which are comparatively easy to produce, and the particles of which are such as to retain their mechanical strength during extensive usage.

A more specific object of our invention is to provide a class of catalysts which comprise the heretofore well known catalytic agents distended upon a carrier material which is considerably less costly than the carriers normally employed in the catalysts in the particular processes herein under consideration. The net result of the attainment of this object is to materially reduce the initial cost of the catalyst, thus reducing by indirection the cost of the process in which it is employed.

A further object of the invention is to provide processes for the catalytic reforming of hydrocarbons wherein the catalysts, as herein disclosed, may be employed. In particular it is a correlative and more specific object of the invention to provide a process for the simultaneous reforming and desulfurization of petroleum hydrocarbon stocks utilizing therein a catalyst of the present invention.

Other objects and advantages of our invention will become apparent to those skilled in the art as the description thereof proceeds.

The term "conversion," pertaining to the conversion of hydrocarbons carries a broad connotation and includes many specific types of processes. Three important reactions take place in the great majority of these catalytic conversion processes, dehydrogenation, hydrocarbon degradation by carbon-carbon fission, and ring closure. Inasmuch as any mechanism advanced for the interpretation of the dehydrogenation reaction must permit a satisfactory formulation of the reverse process of hydrogenation, hydrogenation may be considered to be included under the category of dehydrogenation. Thus, under the classification of conversion reactions may be included such processes as aromatization, dehydrogenation, hydrogenation and relative thereto desulfurization, cracking, hydroforming, and the like, in which processes one or more of the above types of reactions occur.

In all of these reforming processes there is generally employed a catalyst to accelerate the rate of reaction. Although cracking may constitute an exception to this generalization in the majority of instances catalysts are employed therefor. The catalysts used in such reactions normally comprise a carrier such as alumina, silica, magnesia, zirconia, thoria, titania or in general the refractory metal oxides, upon which carrier is distended a catalytic agent. Such catalytic agents include the oxides or other compounds of metals such as chromium, molybdenum, cobalt, nickel, zinc, iron, lead, beryllium, cadmium, vanadium, manganese, tantalum, tungsten, titanium, platinum, columbium, scandium, thorium, aluminum, uranium, zirconium, tin, copper, etc., or combinations of two or more of such compounds.

Of these catalytic agents those which appear to be most effective and consequently find the greatest usage are the compounds of the heavy metals of atomic Nos. 22 to 42 including titanium, vanadium, chromium, manganese, iron, cobalt, nickel, copper, zinc, yttrium, zirconium, columbium, and molybdenum. For example, in the processes of hydroforming and aromatization such metal oxides as molybdenum oxide, chromium oxide, vanadium oxide, copper oxide, or the like, when distended either individually or in combination on a suitable carrier such as alumina are excellent catalysts for the specific reactions necessary to these processes. Also in dehydrogenation of hydrocarbons catalytic agents such as the oxides of chromium, tungsten, iron, copper or nickel are normally employed. The oxides of nickel, copper and iron are also employed, distended on suitable carriers, to catalyze hydrogenation reactions. For the desulfurization of hydrocarbons, a process which involves largely hydrogenation, the oxides and sulfides of such metals as cobalt, molybdenum, iron, manganese and copper have found widespread usage as catalytic agents.

Perhaps the most widely used of these catalytic agents are the oxides of chromium and molybdenum. These elements are found in the left hand column of the periodic table and thus we may define the preferred catalytic agents of our invention as the oxides of those heavy metals of atomic Nos. 22 to 42 which are found in the left hand column of group VI of the periodic table, namely chromium and molybdenum.

In general the catalysts of this nature comprise a major proportion of the desired carrier, i. e., from about 80% to 95% and a minor proportion of a catalytic agent, i. e., from about 5% to about 20%. More specific ranges of catalyst composition may be formulated for individual conversion processes but in general the catalyst used in these processes are of a composition approximating the above percentages. For example, in a process generally described as dehydrogenation a catalyst of 5% chromium oxide and 95% alumina is capable of effecting as much as about 28% conversion of normal butane to butenes at a temperature of 1050° F. Also in aromatization operations, particularly those which have been designated as hydroforming, a typical commercially prepared catalyst consisting of about 10% of molybdenum oxide and 90% alumina is capable of increasing the aromatic content of a naphtha boiling in the range of about 200° to about 250° F. from about 14% to about 60% by volume at a temperature of about 950° F.

Additional examples of catalysts of the type described and other usages in particular reactions are unnecessary for these catalysts are familiar to those skilled in the art of hydrocarbon chemistry.

In the development of catalysts to promote these various hydrocarbon conversion reactions considerable time has been expended in the industry toward the preparation of a superior catalyst employing as one means of attaining the superiority carriers of greater and greater purity. Thus, in the course of the development of the present day hydroforming catalysts, dehydrogenation catalysts, and other catalysts of this nature, the universal trend has been toward the usage of an activated alumina carrier which as an inevitable result of the increased emphasis on purity and surface area has become more and more costly. For example, the earlier hydroforming catalysts consisted of molybdenum oxide distended on a comparatively poor grade of Bayer Process alumina which contained appreciable portions of sodium oxide. One step in the progressive development of this type of catalyst was the preparation of a highly purified Bayer Process alumina which resulted in a catalyst of superior qualifications. There has followed extensive work in the utilization of the highly active gel type aluminas which exhibit surface area in the range of 300 square meters per gram. These gel aluminas, which are now generally considered to be the best presently available carrier material for such catalysts are by virtue of the preparation difficulties relatively expensive, contributing as high as 50% to 70% of the total catalyst cost.

Many metallic oxides are in themselves detrimental to the reforming activity of a catalyst when they are incorporated in the catalyst carrier. Among the oxides, the deleterious effects of which vary at any given concentration, the oxides of iron, sodium, titanium, zirconium and silica must be considered when in association with an alumina carrier. Thus a great deal of work has been done to exclude one or more of these impurities from an alumina down to concentrations well below 0.1%.

We have now found that the presence of all of these erstwhile contaminating materials in a catalyst may be tolerated if their concentrations are adjusted within certain ranges with respect to each other. The reason for this surprising effect is difficult to postulate but it is thought possible that certain of these impurities tend to offset the effects of certain others of the impurities. However, it should be understood that the invention is not to be limited by any proposed theory for the mechanism of its functioning.

Typical bauxites as obtained from Arkansas, British Guiana, and France contain such impurities associated with the alumina as silica, iron oxide, titanium oxide, zirconium oxide, sodium oxide, and the like. Thus, in representative samples of bauxites obtained from the above indicated sources there may be from 4% to 12% of silica, 1% to 25% of iron oxide, 1% to 4% of titanium oxide, and from 12% to 30% of water. When the water content is reduced to the range necessary for the preparation of the catalysts of the present invention as more fully described hereinafter the percentage of these impurities will be even higher.

These bauxites are utilized to prepare the highly purified aluminas presently used as carriers for reforming catalysts. This preparation technique, carried to the degree of purity to which it is, is exceedingly costly and it is to the obviation of the need for such a high degree of purity, and correlatively such as expensive catalyst, that the present invention is directed. As indicated above we have found that this end may be accomplished by only a partial reduction of the concentration of these impurities to a point where the relationships of each to the other does not interfere with the usage of the semi-purified material as a catalyst carrier. The net result of this discovery is to permit the preparation of comparatively inexpensive hydrocarbon reforming catalysts which are at least equivalent to the considerably more expensive catalysts prepared in the highly purified aluminas.

We have found that an alumina containing less than 1% of iron oxide and preferably between 0.1% and 0.5% of iron oxide, less than 7½% of silica and preferably between 2% and 6% of silica, less than 4½% titania and preferably between ½% and 2½% titania and less than 0.1% of sodium oxide and preferably less than 0.02% sodium oxide will, when the water of hydration is controlled within the proper range, result in an excellent catalyst. To obtain this carrier we may partially purify a typical bauxite such as those above described. Any desired means of effecting this partial purification may be employed such as extraction with nitric acid, extraction with hydrochloric acid, fusion, solution and precipitation or the like. In this regard, it is particularly desirable, whenever possible, to employ a raw material in which the silica is found in the proper range for the greatest preparation difficulties arise in removing this oxide from the alumina stock. Of course the optimum situation would involve the selection, if possible, of a bauxite which with little or no treatment would, after adjustment of the water content, meet the above specification. If such is possible the invention becomes even more beneficial as teaching the usage of such a material without undergoing the expensive procedure of complete purification.

Of these various factors it would appear that the iron oxide and the water are the most critical. Thus, over 1% of iron oxide appears to be highly detrimental to the heat stability of the alumina carrier even in the presence of the adjusted percentages of the other impurities and a water content outside of the range of from about 1% to about 8% materially impairs the activity and heat stability of the catalyst. In this respect we have found that a water content above about 3% or 4% exhibits an adverse effect on the catalyst but up to about 8% the adverse effect is not of sufficient magnitude to render the catalyst inoperable. However, about 8% water was found to be highly detrimental. A catalyst prepared on an alumina conforming to present specifications appears to be more active for hydroforming than a corresponding catalyst on a highly purified alumina and at the same time more heat stable than the widely employed Bayer Process aluminas. Further, such a catalyst exhibits higher activity for accomplishing the combined desulfurizing and aromatization of a hydrocarbon feed stock than does a corresponding catalyst prepared from the Bayer Process synthetic aluminas.

The catalysts of the present invention may be prepared from the described carrier in any desired fashion such as for example by impregnation, sublimation, precipitation, or the like. The difficulties of preparing a catalyst of this nature by co-precipitation, which would involve solubilizing the alumina more or less preclude this method of preparation, for it is the elimination, wherever possible, of the necessity of dissolving the alumina to which our invention is directed. In the preparation of the catalysts the problem of controlling the degree of hydration of the carrier is of importance. We have found in this regard it is desirable, although not necessary, in utilizing an alumina or bauxite of high water content to effect the initial dehydration at a slow rate which may be accomplished by heating the carrier before or after other purification operations at a temperature in the range of about 700° F. from ½ to 2 or 3 hours. Subsequent to this treatment the alumina may be further heated at higher temperatures prior to impregnation to reduce the water content to the desired percentage. This secondary heating may be carried out at a temperature in the range of about 600° C. for a period from about ½ to about 3 hours whereupon the carrier is ready for impregnation. The impregnation is simply and economically carried out by immersing the purified carrier in a solution of the prepared concentration of the desired metal salt such as for example ammonium molybdate, chromium nitrate, chromic acid anhydride, vanadium pentoxide dissolved in hydrochloric acid, or the like, whereupon a portion of the metal salt in solution is adsorbed on the carrier. The impregnated carrier is subsequently heated to a temperature in the range of from 500° F. to 1200° F. for a period of from 1 to 4 hours to effect the conversion of the metal salt to the corresponding metal oxide.

Alternative impregnation techniques may be employed, or if desired, other means of preparation may be used providing, however, that the degree of hydration of the carrier is controlled within the approximate limits herein set forth.

The catalysts of the type herein described may, by judicious selection of the catalytic agents employed, be utilized in any hydrocarbon conversion or reforming process and particularly those processes which are carried out at comparatively high temperatures as for example in the range of about 500° F. to about 1200° F. More specifically for the aromatization of hydrocarbons, which term by implication includes hydroforming, we prefer to employ a catalyst comprising from about 5% to about 15%, and preferably from about 6% to about 10% of an oxide of a heavy metal of atomic Nos. 22 to 42, and particularly chromium oxide or molybdenum oxide. In carrying out the aromatization or hydroforming reaction we may employ temperatures of from about 800° F. to about 1200° F. and preferably from about 900° F. to about 1100° F. with pressures from about atmospheric to about 500 pounds per square inch and preferably from about 50 to about 250 pounds per square inch. The liquid hourly space velocities employed in this process may range from about 0.2 to about 4.0 but are preferably maintained in the range of from about 1.0 to about 2.0. In some instances, depending upon the type of feed stock employed the aromatization reaction is more advantageously carried out in the presence of hydrogen in which case we may employ a hydrogen rich gaseous recycle of from about 1,000 to about 5,000 cubic feet per barrel of feed. In other instances, however, such as for example in the aromatization of a substantially paraffinic feed stock, the reaction may be favored by the absence of hydrogen and it is to be understood that it is within the scope of our invention to either employ or eliminate hydrogen as the individual application dictates.

For the dehydrogenation of the hydrocarbons we prefer to employ such metal oxides as the oxides of chromium, tungsten, iron, copper or nickel, of which we have found chromium oxide to be the most effective in association with the alumina carrier of this invention. The catalysts for this reaction should contain from about 5% to about 20% of the catalytic agent distended on from 80% to 90% of the carrier, but we have found that the best results are obtained with those catalysts in which the catalytic agent is present in an amount of from about 5% to about 15%. The usage of the term "bauxite" in the description of these processes and the catalysts to be employed therein is intended to indicate the particular purified bauxites employed in the catalysts of the present invention and is not intended to imply the usage of the bauxites indiscriminately which as is shown hereinafter are in general inferior carriers. The dehydrogenation process may be carried out according to our invention at temperatures in the range of from about 900° F. to about 1200° F. and preferably in the range of from about 1000° F. to about 1100° F. The dehydrogenation reaction is favored by low pressures and we thus prefer to employ pressures in the neighborhood of atmospheric or below. Space velocities may vary over a wide range depending upon the type of hydrocarbon to be dehydrogenated. Thus, we may use space velocities of about 1000 volumes of gas per volume of catalyst per hour or higher for the dehydrogenation of the lower molecular weight paraffin hydrocarbons such as propane, butane, and pentane, and we may employ space velocities somewhat lower as for example in the range of about 300 to 600 for the dehydrogenation of the lower molecular weight olefins. In the latter case a diluent such as steam, carbon dioxide, nitrogen, or the like, may be advantageously commingled with the gaseous olefin feed.

It is well known that the presence of sulfur compounds in hydrocarbon stocks lowers the value of these stocks for motor fuel purposes, and the like. A great deal of work has been done with respect to the catalytic desulfurization of these stocks employing many different and varied catalysts. We have found, however, that it is highly desirable to accomplish the simultaneous desulfurization and reforming of such a stock so as not only to reduce considerably the sulfur content thereof but to prepare at the same time a hydrocarbon fraction of increased aromaticity and thus of increased value. For this combined desulfurization and reforming we have found that the oxides of molybdenum and chromium either individually or in combination with each other are effective catalytic agents when distended on the particular bauxites or aluminas contemplated in our invention. Such a catalyst may consist, for example, of from about 5% to about 15% of molybdenum or chromium oxide or a mixture of the two. We have found, however, that the preferable range of either of these catalytic agents is between about 7% and about 10% when distended on the carriers herein disclosed.

This combined desulfurization and reforming reaction may be accomplished at temperatures ranging from about 500 to about 1000° F. The degree of reforming being proportional to the increase in temperature, we have found that the reaction is preferably carried out at temperatures in the range of about 700° F. to about 950° F. This combined reaction is apparently favored at elevated pressures and may be carried out at pressures ranging from about 50 pounds to about 500 pounds per square inch or higher. The higher pressures favoring the desulfurization reaction and at the same time the undesirable destruction of the feed. Thus, for the simultaneous desulfurization and reforming of a low boiling naphtha pressures in the range of about 50 to about 200 pounds per square inch are generally preferable, whereas, if a gas oil or heavier feed is to be treated pressures of 300 pounds per square inch or higher appear more satisfactory. Because of the mechanism of the desulfurization reaction and the reforming reaction and as a result of the presence of olefins in the great majority of such sulfur containing feeds it is desirable to carry out this combination reaction in the presence of a hydrogen rich recycle gas in quantities of about 1000 to about 5000 cubic feet per barrel of feed.

It is to be understood that the foregoing discussion is not intended to limit the usage of the catalysts of the present invention to those particular reforming processes described in some detail, inasmuch as they are applicable to usage in any conversion process and particularly in those conversion processes which may be characterized by the necessity of the usage of comparatively high temperatures such as for example, from about 500° F. to about 1200° F.

The novelty and advantages of our invention will be even more apparent from the following examples in which catalysts prepared from conventional bauxites, catalysts prepared from the particular aluminas of the present invention and catalysts prepared from highly purified and expensive synthetic aluminas are compared for activity and heat stability in various hydrocarbon conversion processes.

EXAMPLE I

Four catalysts were prepared by impregnation as follows:

Catalyst No. 1, comprising 8.6% by weight of molybdenum oxide distended on alumina, was prepared by immersing an alumina carrier conforming to the specifications of our invention in a solution of ammonium molybdate, subsequently drying the impregnated carrier at a temperature in the range of 150° F. to 200° F. for several hours and calcining the dried composition for two hours at 600° C. to convert the adsorbed ammonium molybdate to moylbdenum oxide.

The alumina employed in the preparation of catalyst No. 1 contained 0.61% by weight of $Fe_2O_3$, 5.1% of $SiO_2$, 1.35% of $TiO_2$ with just a trace of $ZrO_2$ and $MgO$ (analyzed on the basis of dry water). The alumina containing considerable water of hydration was slowly heated to a temperature of 750° F. and held at that temperature for approximately one-half hour to reduce the water content from about 30% to about 6%. Prior to impregnation the carrier was heated at 600° C. for two hours to further reduce the water content to 1½%. The carefully dehydrated carrier was subsequently impregnated as described above.

Catalyst No. 2, comprising 8.9% by weight of chromium oxide distended on alumina, was prepared in the same manner as catalyst No. 1 employing the same alumina and same preparation and purification procedures using chromium nitrate in place of ammonium molybdate in the impregnating solution.

Catalyst No. 3 comprising 8.7% by weight of molybdenum oxide distended on a highly purified Bayer Process alumina was also prepared by impregnation in a manner similar to that of catalysts Nos. 1 and 2. Catalyst No. 3 is representative of a commercial hydroforming catalyst finding widespread usage in the industry today.

Catalyst No. 4 comprising 11.1% by weight of molybdenum oxide distended on a very pure synthetic gel-type alumina is also representative of a commercial catalyst which, however, finds limited usage due to the expense of the gel alumina. This catalyst was also prepared by impregnation but the presence of a larger amount of molybdenum oxide is to be noted for, as is familiar to anyone skilled in the art, the increase of $MoO_3$ will result in an increased activity.

In order to substantiate this effect of higher content of molybdenum oxide, a catalyst was prepared in a manner duplicating the preparation of catalyst No. 1. This catalyst, designated No. 5, contained 13.3% by weight of molybdenum oxide.

Each of these catalysts was tested for activity for the simultaneous desulfurization and reforming of a pressure distillate containing 3.35 weight per cent sulfur, approximately 11 volume per cent aromatics and approximately 38 volume per cent olefins. The reaction in each case was carried out over a stationary bed of catalyst at 950° F., 150 pounds per square inch pressure, a liquid hourly space velocity of 1.0, a hydrogen recycle of 3000 cubic feet per barrel of feed and with a four hour process period. The significant data from these runs are recorded in Table I below.

TABLE I

Combination desulfurizing and reforming of high-sulfur pressure distillate

| Catalyst No. | 1 | 2 | 3 | 4 | 5 |
|---|---|---|---|---|---|
| $MoO_3$ content, wt. per cent | 8.6 |  | 8.7 | 11.1 | 13.3 |
| $Cr_2O_3$ content, wt. per cent |  | 8.9 |  |  |  |
| Liquid Recovery, vol. per cent | 84.5 | 84.8 | 88.6 | 80.8 | 79.6 |
| Sulfur in Product, wt. per cent | 0.09 | 0.12 | 0.16 | 0.10 | 0.14 |
| Olefins, vol. per cent | 7.7 | 7.5 | 9.3 | 6.8 | 5.4 |
| Aromatic Synthesis, vol. per cent | 16.6 | 17.6 | 13.9 | 19.9 | 20.6 |
| Carbon deposition, wt. per cent of Catalyst | 4.5 | 2.0 | 3.8 | 7.7 | 6.5 |

It will be noted from these data, upon taking into consideration the differences in molybdenum content of the various catalysts, that the three catalysts (Nos. 1, 2 and 5) prepared on a carrier of the present invention are superior in substantially every respect to catalyst No. 3 prepared on a purified Bayer Process alumina. Further, it is apparent that these partially purified alumina based catalysts are comparable to catalyst No. 4 prepared from an expensive synthetic alumina gel. The higher conversion to aromatics exhibited by catalyst No. 4 in relation to catalysts Nos. 1 and 2 can be attributed to the additional $MoO_3$ contained thereon. This becomes evident upon comparison with catalyst No. 5. Of particular importance, from a process standpoint, is a comparison of the carbon depositions. Even catalyst No. 5 exhibiting a higher activity than catalyst No. 4 induced less carbon-carbon rupture and coking than did catalyst No. 4. The chromia-alumina catalyst No. 2, of comparable activity to catalyst No. 4, exhibited less than one-third the carbon deposition of the latter catalyst.

That typical bauxites are not good carriers, and in fact that only a small percentage are good carriers, has been repeatedly substantiated in our tests and is evident from the following example.

to these hydroforming runs consisted of a naphthene rich petroleum fraction boiling between about 200° F. and 250° F. Pertinent data from which comparisons may be drawn are given in Table III below:

TABLE III

| Catalyst No. | 6 | | 7 | | 8[1] | | 9 | | 10 | | 11 | |
|---|---|---|---|---|---|---|---|---|---|---|---|---|
| $MoO_3$ content, wt. per cent | 8.0 | | 7.97 | | 7.91 | | 7.21 | | 10.0 | | 8.40 | |
| Catalyst Condition | Fresh | 800° C. | Fresh | 800° C. | Fresh | 800° C. | Fresh | 800° C. | Fresh | 800° C. | Fresh | 800° C. |
| Liquid Recovery, vol. per cent | 73.4 | 80.0 | 73.7 | 83.8 | 71.0 | 75.4 | 75.7 | 83.7 | 68.6 | 83.7 | 63.3 | 78.0 |
| Synthetic Aromatic Yield, vol. per cent | 37.3 | 29.7 | 34.0 | 28.5 | 28.5 | 27.9 | 28.9 | 18.2 | 34.3 | 19.6 | 26.3 | 22.3 |

[1] Moisture content of carrier No. 8 not reduced to preferred range prior to impregnation.

EXAMPLE II

Catalysts Nos. 6, 7, 8, 9, 10 and 11 were prepared in the manner of catalyst No. 1 above on various types of carriers which for convenience may be designated as carriers Nos. 6, 7, 8, 9, 10, and 11 corresponding to the numbers of the catalysts in which they were employed. Each of these samples was slowly dehydrated to a water content of about 6% followed by further dehydration of all but No. 8 to a water content of 1½% to 2% before impregnation with the ammonium molybdate. Samples 7 and 8 represent the same alumina differing only in that the water content of No. 7 had been reduced to the lower value before impregnation while that of No. 8 was reduced only to 6%. Pertinent analytical data on each of these carrier samples are given in Table II below. The figures are in each case based upon a water content of 6%. Carriers No. 6, 7 and 8 represent aluminas which were treated to conform to the specifications of the present invention while carriers No. 9, 10 and 11 represent three samples of typical bauxites which were treated only to reduce the water content to a value equivalent to that of Nos. 6, 7 and 8.

TABLE II

*Analysis of catalyst carriers*

| Carrier No. | 6 | 7 | 8 | 9 | 10 | 11 |
|---|---|---|---|---|---|---|
| $Fe_2O_3$, Wt. Per cent | 0.46 | 0.29 | 0.29 | 1.38 | 1.46 | 9.4 |
| $SiO_2$, Wt. Per cent | 6.73 | 6.14 | 6.14 | 15.96 | 8.95 | ---- |
| $TiO_2$, Wt. Per cent | 3.3 | 3.5 | 3.5 | 6.5 | 4.1 | ---- |
| $ZrO_2$, Wt. Per cent | 1.0 | 0.7 | 0.7 | trace | 2.35 | ---- |

Each of these catalysts was tested for hydroforming activity in a fixed bed process when fresh and after a six-hour heat treatment at 800° C. The same operating conditions were used in all runs namely: 950° F. isothermal reactor temperature; 1.0 liquid hourly space velocity; 100 pounds per square inch pressure, and in the presence of 3000 cubic feet of a hydrogen rich recycle gas per barrel of feed. The feed It is apparent from these data that the high iron, silica and titania content catalysts are inferior to those prepared according to the specifications of the present invention both in initial activity and heat stability. Further it will be observed by reference to the data relative to catalysts No. 7 and 8 that the reduction of the water content of the alumina to the preferred range of 1% to 3% prior to the impregnation thereof with ammonium molybdate materially affects the activity of the catalyst although, as would be expected, exerts little effect on the heat stability. From these figures the merits of our invention are readily discernible.

EXAMPLE III

To illustrate the effectiveness of the carriers of the present invention as compared to conventional hydroforming catalysts three catalysts were prepared; one on an alumina conforming to the specifications herein set forth, one on a highly purified Bayer Process alumina and one on a synthetic gel type alumina. Each of these catalysts was prepared by impregnating the previously heated carrier (600° C. for two hours) with an ammonium molybdate solution in the same manner as catalyst No. 1.

Catalyst No. 12 comprising 8.0% by weight of molybdenum oxide, was prepared on an alumina containing 0.46% by weight of $Fe_2O_3$, 6.73% by weight of $SiO_2$ and 3.3% by weight of $TiO_2$.

Catalyst No. 13 comprising 8.6% by weight of $MoO_3$, was prepared on a Bayer Process alumina containing less than 0.1% by weight of $Fe_2O_3$, 0.1% by weight of $SiO_2$, and substantially no $TiO_2$ or $Na_2O$.

Catalyst No. 14 comprising 11.1% by weight of $MoO_3$, was prepared on a synthetic gel alumina containing about 0.1% by weight of $Fe_2O_3$, 5.4% by weight of $SiO_2$, and substantially no $TiO_2$ or $Na_2O$. Attention is called to the relatively higher content of $MoO_3$ in this catalyst which as previously indicated should result in a higher activity.

Both catalysts No. 13 and 14 are considerably purer than is catalyst No. 12, and although for this reason they are more expensive the following data shows that they are not in any way superior to the bauxite containing catalyst.

Each of these catalysts was tested for hydroforming activity in a fixed bed process when fresh and after a six-hour heat treatment at 800° C. The same operating conditions were used in all runs, namely; 950° F. isothermal reactor temperature; 1.0 liquid hourly space velocity; 100 pounds per square inch gauge pressure, and in the presence of 3000 cubic feet of a hydrogen rich recycle gas per barrel of feed. The feed to these hydroforming runs consisted of a naphthene rich petroleum fraction boiling between about 200° F. and 250° F. Pertinent data from which comparisons may be drawn are given in Table IV below:

TABLE IV

| Catalyst designation No. | 12 | | 13 | | 14 | |
|---|---|---|---|---|---|---|
| MoO₃ content, wt. per cent | 8.0 | | 8.6 | | 11.1 | |
| Catalyst pretreatment | Fresh | 800° C. | Fresh | 800° C. | Fresh | 800° C. |
| Liquid Recovery, Vol. per cent | 73.4 | 80.0 | 74.0 | 88.5 | 72.5 | 75.5 |
| Synthetic Toluene, Vol. per cent | 19.2 | 16.5 | 16.0 | 11.4 | 16.6 | 16.5 |

The superiority of the catalyst of our invention (No. 12) over either of the other catalysts for toluene synthesis when fresh, and the greater heat stability than catalyst No. 13, clearly illustrates the effectiveness of aluminas containing controlled percentages of impurities when properly utilized as catalyst carriers.

It is to be understood that the foregoing examples are not intended to limit our invention to the particular applications set forth. We have shown a means of preparing comparatively inexpensive catalysts for hydrocarbon conversion reactions by partially purifying certain aluminas to give relative proportions of contaminating constituents which aluminas when treated so as to contain water in well defined proportions, may be used as catalyst carriers and as such are equivalent and in many cases superior to the more expensive carriers now being employed.

We claim:

1. A process for the catalytic conversion of hydrocarbons which comprises subjecting such hydrocarbons to temperatures in the range of about 500° F. to about 1200° F. under gauge pressures in the range of about —14 pounds per square inch to about 1500 pounds per square inch in the presence of a catalyst comprising from about 1% to about 15% of an oxide of a heavy metal of atomic No. 22 to 42, and from about 85% to 99% of bauxite containing oxides of iron, silicon, titanium and sodium in small amounts as follows: less than 1.0% by weight of iron oxide, less than 7.5% by weight of combined silicon oxide, less than 4.5% by weight of titanium oxide, less than 0.1% by weight of sodium oxide, and from 1% to 6% by weight of volatile matter.

2. A process for the catalytic reforming of hydrocarbons which comprises subjecting such hydrocarbons to temperatures in the range of about 500° F. to about 1200° F. under gauge pressures in the range of about —14 pounds per square inch to about 1500 pounds per square inch in the presence of a catalyst comprising from about 1% to about 15% of an oxide of a heavy metal of atomic No. 22 to 42 and from about 85% to 99% of bauxite containing oxides of iron, silicon, titanium and sodium in small amounts as follows: less than 0.5% by weight of iron oxide, from 2.0% to 6.0% by weight of silicon oxide, from ½% to 2½% by weight of titanium oxide, less than 0.02% by weight of sodium oxide, and from 1% to 3% by weight of volatile matter.

3. A process for the catalytic aromatization of hydrocarbons which comprises subjecting such hydrocarbons to temperatures in the range of about 800° F. to about 1200° F. under gauge pressures in the range of about atmospheric to about 500 pounds per square inch in the presence of a catalyst comprising from about 1% to about 15% by weight of molybdenum oxide and from about 85% to about 99% by weight of bauxite containing from 0.1% to 0.5% by weight of iron oxide, from 2% to 6% by weight of silicon oxide, from ½% to 2½% by weight of titanium oxide, less than 0.02% by weight of sodium oxide, and from 1% to 3% by weight of volatile matter.

4. A process for catalytic aromatization of hydrocarbons which comprises subjecting such hydrocarbons to temperatures in the range of about 800° F. to about 1200° F. under gauge pressures in the range of about atmospheric to about 500 pounds per square inch in the presence of a hydrogen rich recycle gas in amount of about 1500 to about 6000 cubic feet of hydrogen rich gas per barrel of feed with a catalyst comprising from about 5% to 12% of molybdenum oxide and from about 88% to 95% of a bauxite containing oxides of iron, silicon, titanium and sodium in small amounts as follows: less than 0.5% by weight of iron oxide, from 2.0% to 6.0% by weight of silicon oxide, from ½% to 2½% by weight of titanium oxide, less than 0.02% by weight of sodium oxide, and from 1% to 3% by weight of volatile matter.

5. A process for the catalytic dehydrogenation of hydrocarbons which comprises subjecting such hydrocarbons to temperatures in the range of about 800° F. to about 1200° F. at gauge pressures of about —14 pounds to about atmospheric in the presence of a catalyst which comprises from 1% to 15% by weight of an oxide of a heavy metal of atomic Nos. 22 to 42 and from 85% to 99% by weight of a bauxite containing from 0.1% to 0.5% by weight of iron oxide, from 2.0% to 6.0% by weight of silicon oxide, from ½% to 2½% by weight of titanium oxide, less than 0.02% by weight of sodium oxide, and from 1% to 3% by weight of volatile matter.

6. A process for the catalytic dehydrogenation of hydrocarbons which comprises subjecting such hydrocarbons to temperatures in the range of about 800° F. to about 1200° F. at gauge pressures of about —14 pounds to about atmospheric in the presence of a catalyst comprising from about 5% to about 15% of chromium oxide and from about 85% to about 95% of a bauxite containing oxides of iron, silicon, titanium and sodium in small amounts as follows: less than 0.5% by weight of iron oxide, from 2.0% to 6.0% by weight of silicon oxide, from ½% to 2½% by weight of titanium oxide, less than 0.02% by weight of sodium oxide and from 1% to 3% by weight of volatile matter.

7. A catalytic process for the simultaneous desulfurization and aromatization of a sulfur containing hydrocarbon which comprises subjecting such sulfur containing hydrocarbon to temperatures in the range of about 800° F. to about 1200° F. at gauge pressures in the range of about 50 pounds per square inch to about 500 pounds per square inch in the presence of a catalyst comprising from about 1% to about 15% by weight of an oxide of a heavy metal of atomic No. 22 to 42 and from 85% to 99% by weight of a bauxite containing from 0.1% to 0.5% by weight of iron oxide, from 2.0% to 6.0% by weight of silicon oxide, from ½% to 2½% by weight of titanium oxide, less than 0.02% by weight of sodium oxide, and from 1% to 3% by weight of volatile matter.

8. A catalytic process for the simultaneous desulfurization and reforming of a sulfur containing hydrocarbon which comprises subjecting such sulfur containing hydrocarbon fraction to temperatures in the range of about 800° F. to about 1200° F. at gauge pressures of about 50 pounds to about 500 pounds per square inch in the presence of a catalyst comprising from about 5% to about 15% of molybdenum oxide and from about 85% to 95% of a bauxite containing oxides of iron, silicon, titanium and sodium in small amounts as follows: less than 0.5% by weight of iron oxide, from 2.0% to 6.0% by weight of silicon oxide, from ½% to 2½% by weight of titanium oxide, less than 0.02% by weight of sodium oxide, and from 1% to 3% by weight of volatile matter.

9. A catalytic process for the simultaneous desulfurization and aromatization of a sulfur containing hydrocarbon mixture which comprises subjecting such hydrocarbon mixture to a temperature in the range of about 800° F. to about 1200° F. in the presence of hydrogen and a catalyst prepared by partially purifying a bauxite containing from about 4% to 12% of silica, 1% to 25% of iron oxide, 1% to 4% of titanium oxide, and from 12% to 30% of water, so as to obtain an alumina carrier containing between about 0.1% and 0.5% of iron oxide, between about 2% and 6% of combined silicon oxide, between about 0.5% and 2.5% titanium oxide, less than 0.02% of sodium oxide, and from 1% to 3% by weight of volatile matter, and distending between 1% and 15% of a catalytic agent comprising an oxide of a heavy metal of atomic number 22 to 42 on said carrier.

RAYMOND N. FLECK.
PAUL G. NAHIN.

REFERENCES CITED

The following references are of record in the file of this patent:

UNITED STATES PATENTS

| Number | Name | Date |
| --- | --- | --- |
| 1,326,595 | Hutchins | Dec. 30, 1919 |
| 2,183,591 | Schulze | Dec. 19, 1939 |
| 2,184,235 | Groll et al. | Dec. 19, 1939 |
| 2,209,908 | Weiss | July 30, 1940 |
| 2,305,569 | Degnen | Dec. 15, 1942 |
| 2,320,147 | Layng et al. | May 25, 1943 |
| 2,388,536 | Gunness | Nov. 6, 1945 |
| 2,390,917 | Breth et al. | Dec. 11, 1945 |
| 2,422,884 | Burgin | June 24, 1947 |
| 2,424,637 | Smith, Jr. | July 29, 1947 |

OTHER REFERENCES

"Activated Alumina," May 9, 1939, page 1, only needed.

"The Metallurgy of Aluminum and Aluminum Alloys," by Anderson, April 22, 1925, Henry C. Baird & Co. publisher. Page 38 only—Bauxite analysis.

"Handbook of Non-Ferrous Metallurgy," Liddell, page 699 only. McGraw-Hill Book Co., Inc., vol. II, 1926, first edition.